United States Patent
Harrison

(10) Patent No.: US 11,852,749 B2
(45) Date of Patent: Dec. 26, 2023

(54) METHOD AND APPARATUS FOR OBJECT DETECTION USING A BEAM STEERING RADAR AND A DECISION NETWORK

(71) Applicant: Metawave Corporation, Carlsbad, CA (US)

(72) Inventor: Matthew Harrison, Palo Alto, CA (US)

(73) Assignee: Metawave Corporation, Carlsbad, CA (US)

( * ) Notice: Subject to any disclaimer, the term of this patent is extended or adjusted under 35 U.S.C. 154(b) by 989 days.

(21) Appl. No.: 16/370,732

(22) Filed: Mar. 29, 2019

(65) Prior Publication Data

US 2019/0302232 A1 Oct. 3, 2019

Related U.S. Application Data

(60) Provisional application No. 62/651,050, filed on Mar. 30, 2018.

(51) Int. Cl.
*G01S 7/41* (2006.01)
*G01S 13/931* (2020.01)
*G01S 7/03* (2006.01)
*G01S 13/72* (2006.01)

(52) U.S. Cl.
CPC .............. *G01S 7/417* (2013.01); *G01S 7/032* (2013.01); *G01S 13/723* (2013.01); *G01S 13/931* (2013.01)

(58) Field of Classification Search
CPC ........ G01S 7/417; G01S 7/032; G01S 13/723; G01S 13/931
See application file for complete search history.

(56) References Cited

U.S. PATENT DOCUMENTS

| | | | |
|---|---|---|---|
| 6,492,949 B1 | 12/2002 | Breglia et al. | |
| 10,242,457 B1* | 3/2019 | Sibley | ........................ G06T 7/73 |
| 10,605,911 B1* | 3/2020 | Parker | ..................... G01S 13/42 |
| 10,627,507 B1* | 4/2020 | Parker | .................... H01Q 25/00 |
| 2002/0147534 A1* | 10/2002 | Delcheccolo | .......... G01S 13/343 342/72 |
| 2008/0272955 A1 | 11/2008 | Yonak et al. | |
| 2009/0251362 A1* | 10/2009 | Margomenos | ........ G01S 13/931 342/175 |
| 2009/0289863 A1 | 11/2009 | Lier | |

(Continued)

FOREIGN PATENT DOCUMENTS

KR 101527771 6/2015

OTHER PUBLICATIONS

M. Töns et al.,"Radar Sensors and Sensor Platform used for Pedestrian Protection in the EC-funded Project SAVE-U," IEEE Intelligent Vehicles Symposium, 2004, Parma, Italy, pp. 813-818, Jun. 2004.

(Continued)

*Primary Examiner* — Matthew M Barker

(57) ABSTRACT

Examples disclosed herein relate to a radar system in an autonomous vehicle. The radar system has a radar module including at least one beam steering antenna and an antenna controller. The radar system also includes a perception module having an object detection module to detect objects in a path and surrounding environment of the autonomous vehicle, and a decision network to determine a control action for the antenna controller to perform based on the detected objects and a control policy.

11 Claims, 7 Drawing Sheets

(56) References Cited

U.S. PATENT DOCUMENTS

| | | |
|---|---|---|
| 2013/0241765 A1 | 9/2013 | Kozma et al. |
| 2016/0003938 A1* | 1/2016 | Gazit .................. G01S 13/02 342/81 |
| 2016/0011307 A1* | 1/2016 | Casse .................. G01S 13/426 701/93 |
| 2016/0061935 A1 | 3/2016 | McCloskey et al. |
| 2016/0233588 A1 | 8/2016 | Bily et al. |
| 2018/0082137 A1* | 3/2018 | Melvin .................. G01S 7/417 |

OTHER PUBLICATIONS

S. Carpenter, "Autonomous Vehicle Radar: Improving Radar Performance with Simulation," White Paper, High Frequency/Electronics Business Unit, ANSYS, Canonsburg, PA, pp. 1-14, 2017.

S. Milch et al., "Pedestrian Detection with Radar and Computer Vision," Smart Microwave Sensors GmbH, Braunschweig, Germany, pp. 1-7, 2001.

J. Lombacher et al., "Potential of Radar for Static Object Classification Using Deep Learning Methods," 2016 IEEE MTT-S International Conference on Microwaves for Intelligent Mobility (ICMIM), San Diego, CA, pp. 1-4, May 2016.

\* cited by examiner

METHOD AND APPARATUS FOR OBJECT DETECTION USING A BEAM STEERING RADAR AND A DECISION NETWORK

CROSS-REFERENCE TO RELATED APPLICATIONS

This application claims priority to U.S. Provisional Application No. 62/651,050, filed on Mar. 30, 2018, and incorporated herein by reference in their entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Methods and apparatuses for object detection using a beam steering radar and a decision network are disclosed. The methods and apparatuses include the acquisition of raw data by a beam steering radar in an autonomous vehicle and the processing of that data through a perception module to extract information about multiple objects in the vehicle's Field-of-View ("FoV"). This information may be parameters, measurements or descriptors of detected objects, such as location, size, speed, object categories, and so forth. The objects may include structural elements in the vehicle's FoV such as roads, walls, buildings and road center medians, as well as other vehicles, pedestrians, bystanders, cyclists, plants, trees, animals and so on.

In various examples, the beam steering radar incorporates at least one beam steering antenna that is dynamically controlled such as to change its electrical or electromagnetic configuration to enable beam steering. The dynamic control is aided by the perception module, which upon detecting objects in the vehicle's FoV engages a decision network to control the beam steering antenna in response to the detected objects. This provides a dynamically steerable antenna beam, enabling the beam steering antenna to focus on one or more portions of the FoV while optimizing the antenna capabilities and reducing the time for the identification of objects.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
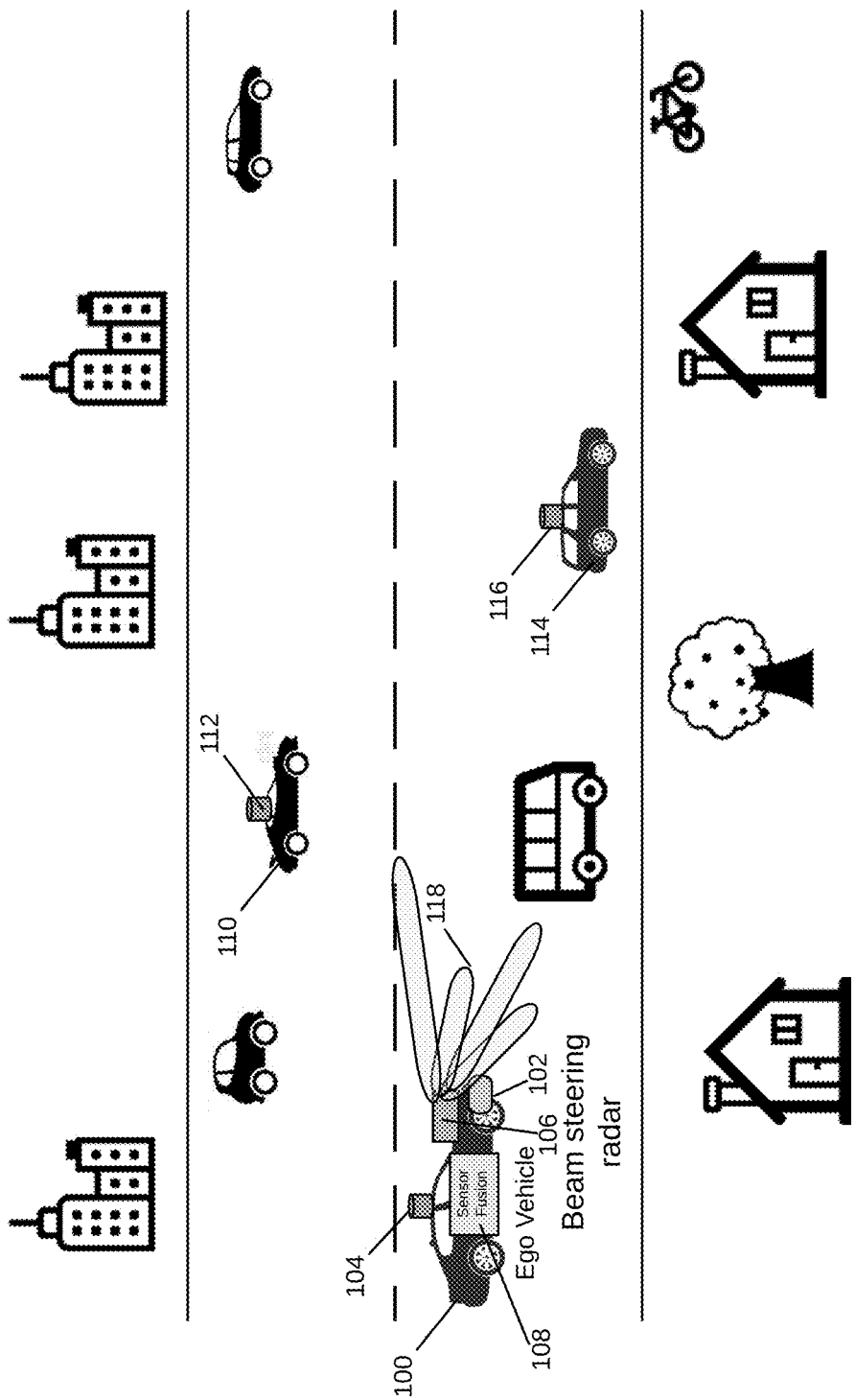
FIG. 1 illustrates an example environment in which a beam steering radar system in an autonomous vehicle is used to detect and identify objects.

FIG. 1 illustrates an example environment in which a beam steering radar system in an autonomous vehicle is used to detect and identify objects. Ego vehicle 100 is an autonomous vehicle with a beam steering radar system 106 for transmitting a radar signal to scan a FoV or specific area. In various examples, the radar signal is transmitted according to a set of scan parameters that can be adjusted to result in multiple transmission beams 118. The scan parameters may include, among others, the total angle of the scanned area from the radar transmission point, the power of the transmitted radar signal, the scan angle of each incremental transmission beam, as well as the angle between each beam or overlap therebetween. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as camera 102 and lidar 104. These perception sensors are not required for the ego vehicle 100, but may be useful in augmenting the object detection capabilities of the beam steering radar system 106. Camera sensor 102 may be used to detect visible objects and conditions and to assist in the performance of various functions. Lidar sensor 104 can also be used to detect objects and provide this information to adjust control of the vehicle. This information may include information such as congestion on a highway, road conditions, and other conditions that would impact the sensors, actions or operations of the vehicle. Camera sensors are currently used in Advanced Driver Assistance Systems ("ADAS") to assist drivers in driving functions such as parking (e.g., in rear view cameras). Cameras are able to capture texture, color and contrast information at a high level of detail, but similar to the human eye, they are susceptible to adverse weather conditions and variations in lighting. Camera 102 may have a high resolution but cannot resolve objects beyond 50 meters.

Lidar sensors typically measure the distance to an object by calculating the time taken by a pulse of light to travel to an object and back to the sensor. When positioned on top of a vehicle, a lidar sensor is able to provide a 360° 3D view of the surrounding environment. Other approaches may use several lidars at different locations around the vehicle to provide a full 360° view. Lidar sensors such as lidar 104 are, however, still prohibitively expensive, bulky in size, sensitive to weather conditions and are limited to short ranges (typically <150-200 meters). Radars, on the other hand, have been used in vehicles for many years and operate in all-weather conditions. Radars also use far less processing than the other types of sensors and have the advantage of detecting objects behind obstacles and determining the speed of moving objects.

In various examples and as described in more detail below, the beam steering radar system 106 is capable of providing a 360° true 3D vision and human-like interpretation of the ego vehicle's path and surrounding environment. The radar system 106 is capable of shaping and steering RF beams in all directions in a 360° FoV with at least one beam steering antenna. This enables the radar system 106 to recognize objects quickly and with a high degree of accuracy over a long range of around 300 meters or more. The short range capabilities of camera 102 and lidar 104 along with the long range capabilities of radar 106 enable a sensor fusion module 108 in ego vehicle 100 to enhance its overall object detection and identification capabilities and advance the possibility of fully self-driving cars.

Figure 2:
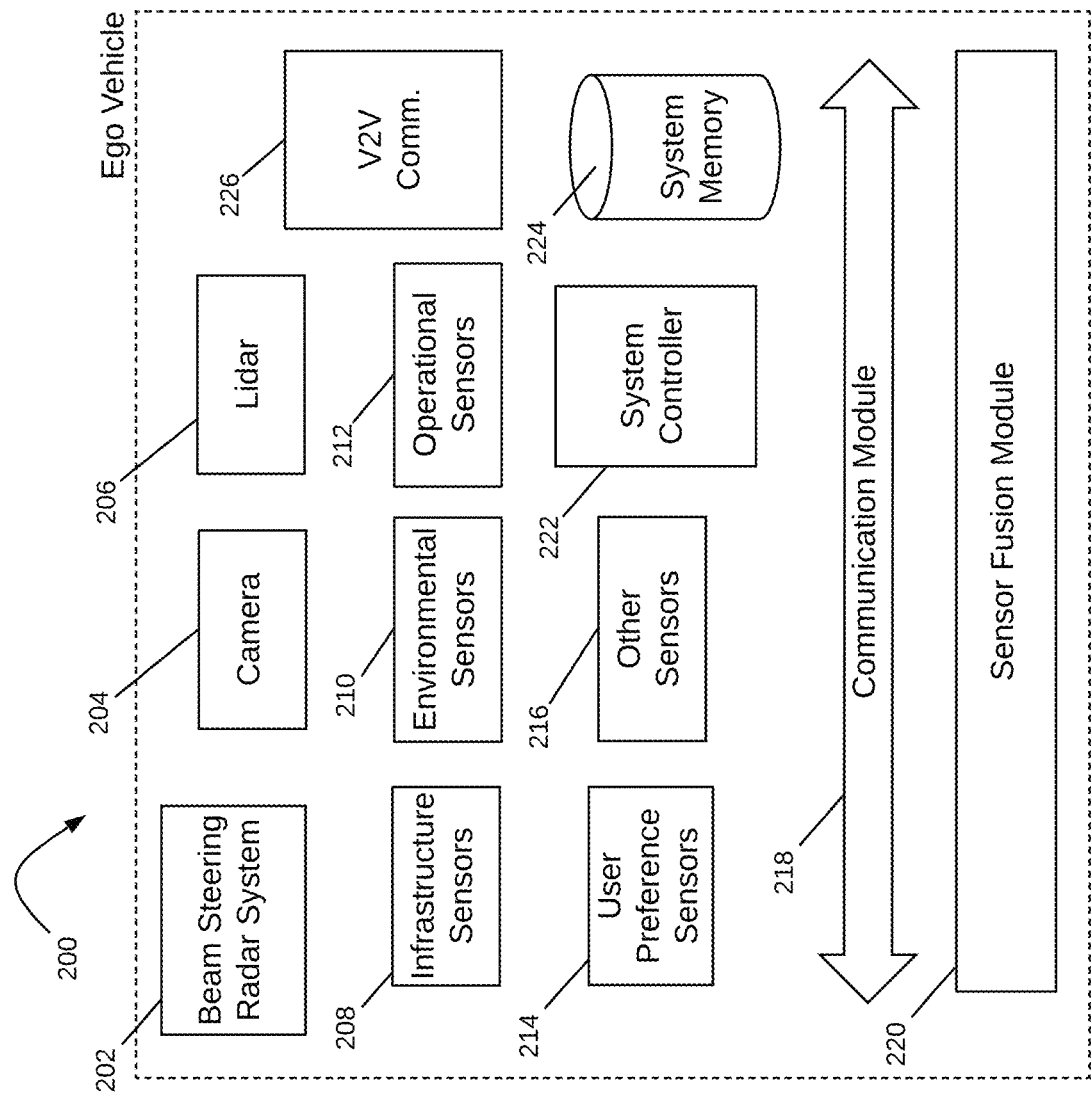
FIG. 2 is a schematic diagram of an autonomous driving system for an autonomous vehicle in accordance with various examples.

Attention is now directed to FIG. 2, which illustrates a schematic diagram of an autonomous driving system for an ego vehicle in accordance with various examples. Autonomous driving system 200 is a system for use in an ego vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes a beam steering radar system 202 and other sensor systems such as camera 204, lidar 206, infrastructure sensors 208, environmental sensors 210, operational sensors 212, user preference sensors 214, and other sensors 216. Autonomous driving system 200 also includes a communications module 218, a sensor fusion module 220, a system controller 222, a system memory 224, and a V2V communications module 226. It is appreciated that this configuration of autonomous driving system 200 is an example configuration and not meant to be limiting to the specific structure illustrated in FIG. 2. Additional systems and modules not shown in FIG. 2 may be included in autonomous driving system 200.

In various examples, beam steering radar system 202 includes at least one beam steering antenna for providing dynamically controllable and steerable beams that can focus on one or multiple portions of a 360° FoV of the vehicle. The beams radiated from the beam steering antenna are reflected back from objects in the vehicle's path and surrounding environment and received and processed by the radar system 202 to detect and identify the objects. Radar system 202 includes a perception module that is trained to detect and identify objects and control the radar module as desired. Camera sensor 204 and lidar 206 may also be used to identify objects in the path and surrounding environment of the ego vehicle, albeit at a much lower range.

Infrastructure sensors 208 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, among others. Operational sensors 212 provide information about the functional operation of the vehicle. This may be tire pressure, fuel levels, brake wear, and so forth. The user preference sensors 214 may be configured to detect conditions that are part of a user preference. This may be temperature adjustments, smart window shading, etc. Other sensors 216 may include additional sensors for monitoring conditions in and around the vehicle.

In various examples, the sensor fusion module 220 optimizes these various functions to provide an approximately comprehensive view of the vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in radar 202 to adjust the radar's scan parameters so as to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new conditions. The configuration may include turning off camera or lidar sensors 204-206 or reducing the sampling rate of these visibility-based sensors. This effectively places reliance on the sensor(s) adapted for the current situation. In response, the perception module configures the radar 202 for these conditions as well. For example, the radar 202 may reduce the beam width to provide a more focused beam, and thus a finer sensing capability.

In various examples, the sensor fusion module 220 may send a direct control to the beam steering antenna in radar system 202 based on historical conditions and controls. The sensor fusion module 220 may also use some of the sensors within system 200 to act as feedback or calibration for the other sensors. In this way, an operational sensor 212 may provide feedback to the perception module and/or the sensor fusion module 220 to create templates, patterns and control scenarios. These are based on successful actions or may be based on poor results, where the sensor fusion module 220 learns from past actions.

Data from sensors 202-216 may be combined in sensor fusion module 220 to improve the object detection and identification performance of autonomous driving system 200. Sensor fusion module 220 may itself be controlled by system controller 222, which may also interact with and control other modules and systems in the vehicle. For example, system controller 222 may turn the different sensors 202-216 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 200 communicate with each other through communication module 218. Autonomous driving system 200 also includes system memory 224, which may store information and data (e.g., static and dynamic data) used for operation of system 200 and the ego vehicle using system 200. V2V communications module 226 is used for communication with other vehicles. The V2V communications may also include information from other vehicles that is invisible to the user, driver, or rider of the vehicle, and may help vehicles coordinate to avoid an accident.

Figure 3:
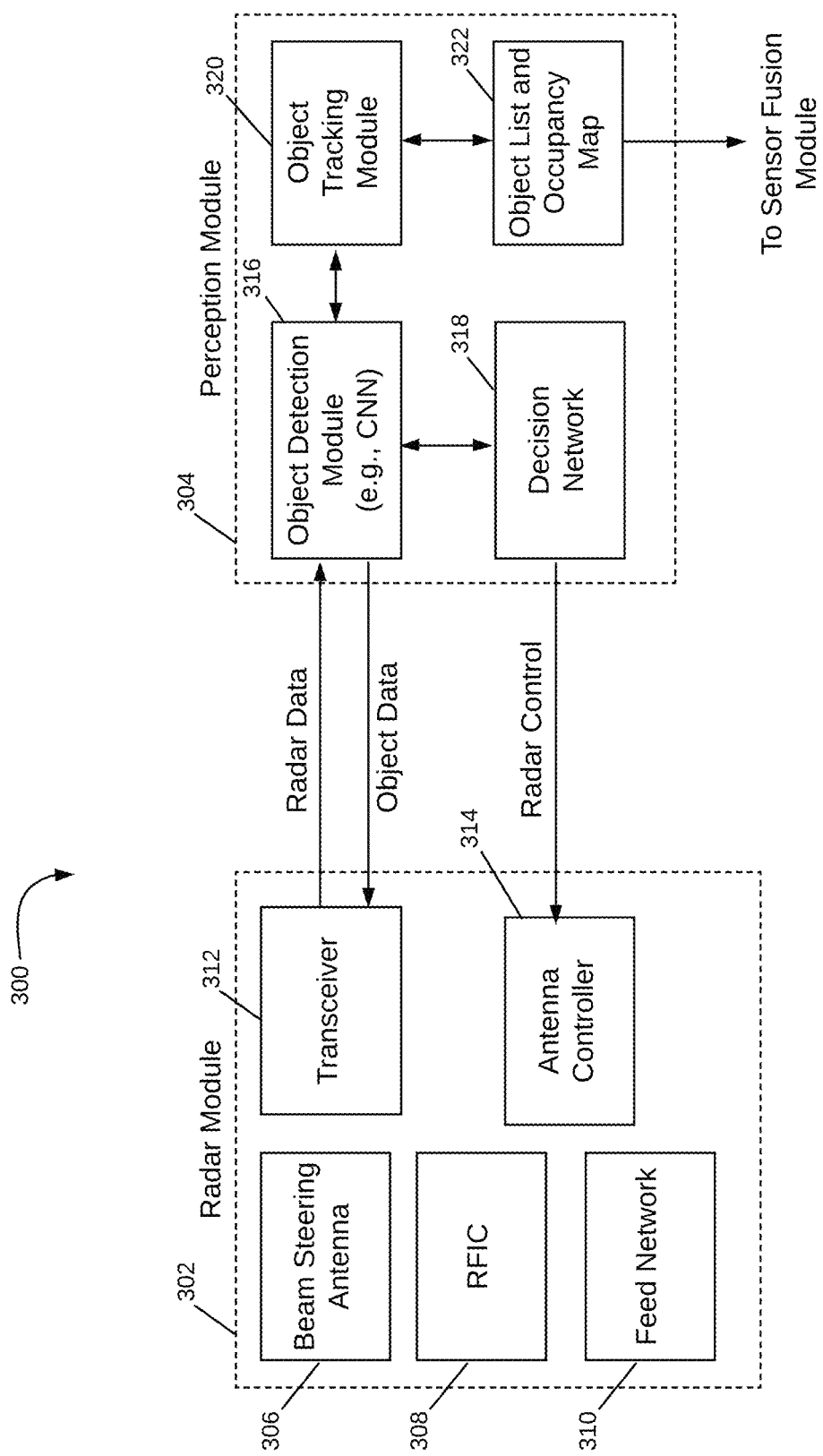
FIG. 3 is a schematic diagram of a beam steering radar system as in FIG. 2 in accordance with various examples.

FIG. 3 illustrates a schematic diagram of a beam steering radar system as in FIG. 2 in accordance with various examples. Beam steering radar system 300 is a "digital eye" with true 3D vision and capable of a human-like interpretation of the world. The "digital eye" and human-like interpretation capabilities are provided by two main modules: radar module 302 and a perception module 304. The radar module 302 includes at least one beam steering antenna 306 for providing dynamically controllable and steerable beams that can focus on one or multiple portions of a 360° FoV of an autonomous ego vehicle.

In various examples, the beam steering antenna may be a meta-structure antenna, a phase array antenna, or any other antenna capable of radiating RF signals in millimeter wave frequencies. A meta-structure, as generally defined herein, is an engineered, non- or semi-periodic structure that is spatially distributed to meet a specific phase and frequency distribution. The meta-structure antenna may be integrated with various structures and layers, including, for example, feed network or power division layer 310 to divide power and provide impedance matching, RFIC 308 to provide steering angle control and other functions, and a meta-structure antenna layer with multiple microstrips, gaps, patches, vias, and so forth. The meta-structure layer may include, for example, a metamaterial layer. Various configurations, shapes, designs and dimensions of the beam steering antenna 306 may be used to implement specific designs and meet specific constraints.

Radar control is provided in part by the perception module 304. Radar data generated by the radar module 302 is provided to the perception module 304 for object detection and identification. The radar data is acquired by the transceiver 312, which has a radar chipset capable of transmitting the RF signals radiated by the beam steering antenna 306 and receiving the reflections of these RF signals. Object detection and identification in perception module 304 is performed in an Object Detection Module 316, which provides object detection information (e.g., location, object category, speed, etc.) to Object Tracking Module 320 for tracking the objects over time, such as, for example, with the use of a Kalman filter. Information on detected objects over time are stored at an Object List and Occupancy Map 322, which keeps tracks of objects' locations and their movement over time as determined by the object tracking module 320. The tracking information provided by the object tracking module 320 combined with the object detection information produces an output containing the type of object identified, their location, their velocity, and so on. This information from radar system 300 is then sent to a sensor fusion module such as sensor fusion module 220 of FIG. 2, where it is processed together with object detection and identification from other sensors in the vehicle.

Upon identifying objects in the FoV of the vehicle, the perception module 304 provides information about the detected object to Decision Network 318, which applies control policies to the received information and affects a corresponding action as appropriate. The decision network 314 provides control instructions to the antenna controller 314, which then applies these controls to change antenna and scan parameters of the radar signal in transceiver 308 such as the steering angle. For example, the perception module 304 may detect a cyclist on the path of the vehicle and direct the radar module 302 to focus additional RF beams at a given steering angle and within the portion of the FoV corresponding to the cyclist's location.

Figure 4:
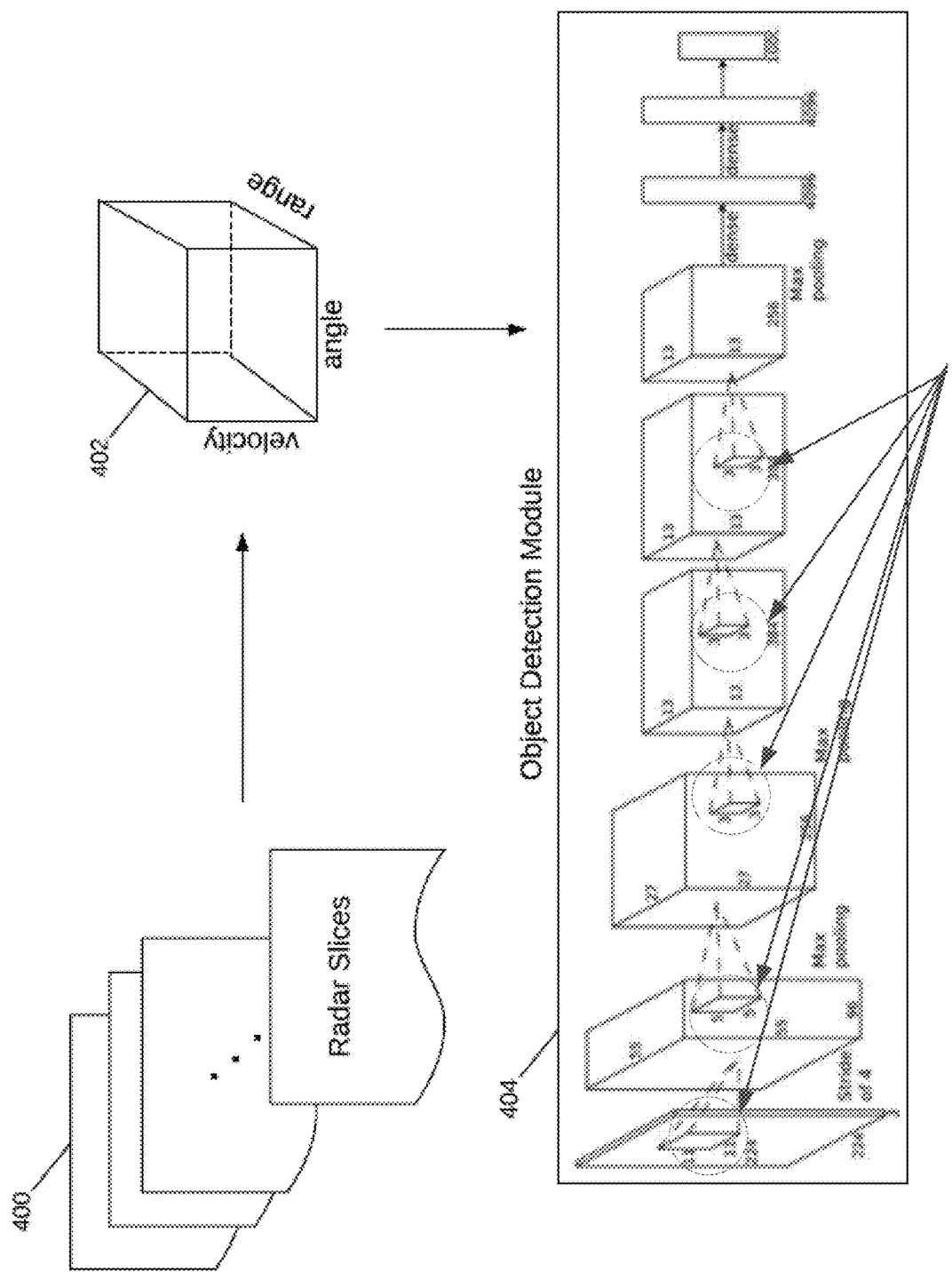
FIG. 4 is a schematic diagram of a radar data and a convolutional neural network for use in an object detection module in accordance with various examples.

FIG. 4 illustrates the format of the radar data acquired by the radar module 302, wherein each radar slice 400 represents the range-Doppler information of a radar scan. These radar slices are compiled into a cube of radar data 402, which may represent a full scan across the azimuth or a full 3D scan of the FoV, and so forth. The radar data cube 402 is input into the object detection module 404, which, in various examples, implements a Convolutional Neural Network ("CNN").

CNN 404 is a fully convolutional neural network ("FCN") with three stacked convolutional layers from input to output (additional layers may also be included in CNN 404). Each of these layers also performs a rectified linear activation function and batch normalization as a substitute for traditional L2 regularization and each layer may include up to 64 filters. Unlike many FCNs, the data is not compressed as it propagates through the network because the size of the input is relatively small and runtime requirements are satisfied without compression. In various examples, the CNN may be trained with raw radar data, synthetic radar data, lidar data and then retrained with radar data, and so on. Multiple training options may be implemented for training the CNN to achieve a good object detection and identification performance.

CNN 404 uses small regions of a visual field and identifies edges and orientations in the field, much like a filter for an image. The image goes through a series of convolutional, nonlinear sampling through layers, resulting in a probability. The layers include a convolutional layer that looks at these small regions individually, referred to as receptive fields. The filter process incorporates weights in connections between layers, and when the original information is passed through this layer, the result is a reduced set of data, referred to as a feature map. The feature map identifies objects detected in each receptive field. Note that there may be any number of feature maps as a function of features used in processing.

The layers of the CNN 404 detect a first level of features, such as edges. The output of each layer feeds the next layer, which detects a second level of feature, such as a square. At the output of each layer in CNN 404 is a feature map identifying the locations of those features. And as data processes through CNN 404, the layers become more complex to further refine the specific object being detected until the object can be properly identified (e.g., as a pedestrian, cyclist, animal, wall, vehicle, etc.). The final layer of the CNN 404 is a fully connected layer that takes an input feature map and outputs an N-dimensional vector, where N is the number of features or classes. Each number of the N-dimensional vector identifies the probability of each corresponding feature.

It is noted that CNN 404 may incorporate other information to help it identify objects in the vehicle's path and surrounding environment. For example, when an object is moving slowly and outside of a road line, it is likely that the object may be a pedestrian, animal, cyclist, and so on.

Similarly, when an object is moving at a high speed, but lower than the average speed of other vehicles on a highway, CNN 404 may use this information to determine if the object is a bus or a truck, which tend in general to move more slowly. The location of an object, such as in the far-right lane of a highway, may also provide an indication as to whether the object may be a slower-moving type of vehicle. If the movement of the object does not follow the path of a road, then the object may be an animal, such as a deer crossing the road. All of this information may be determined from a variety of sensors (e.g., as illustrated in FIG. 2) and other information available to the vehicle, including information provided from weather and traffic services, other vehicles or the environment itself, such as smart roads and smart traffic signals. The sensor fusion module 220 of FIG. 2 analyzes all the information available from the sensors to more accurately detect and identify each object.

The operational accuracy of the CNN 404 is determined by several factors, and one is the training process that provides feedback to the network to adjust its weights; this process is called backpropagation. The CNN 404 trains on known sets of input-to-output data. For example, an input may be the camera data received from a camera sensor at time t1. The known input-output dataset is selected as either raw data or may be synthetic data; the data is digitized, and specific parameters extracted. The data may also be compressed or pre-processed. Either way, there is a set of input data received from a sensor. The CNN 404 does a forward pass through each one of its layers, computing each layer output based on the weights in the layer, and passing the output to the next layer. The output data of CNN 404 is then what information you would like the CNN 404 to provide you when it receives this set of sensor data, i.e., the output of CNN 404 will be in the same form as the known output of the selected data. Its value, however, may differ from the known output. The next step is to compare the output of CNN 404 with the known, expected output from the selected dataset. This can be implemented in a number of ways, such as by Euclidean distance, cross entropy, weighted cross entropy, and other such measures.

A score is determined as an indication of how close the output of CNN 404 matches the expected output. The training continues until an error tolerance indicated by the score is small enough and the outputs of CNN 404 given the known inputs are within a desired tolerance from the known outputs. If they are not, then the score is sent back to the CNN 404 to adjust its weight and the training continues to iterate. Training of CNN 404 is therefore an iterative process, which terminates when the output of the network is sufficiently close to the desired results. There are a variety of methods to adjust the weights in the CNN 404. The goal is to have a CNN 404 that can receive any sensor information and detect objects as closely as possible.

Figure 5:
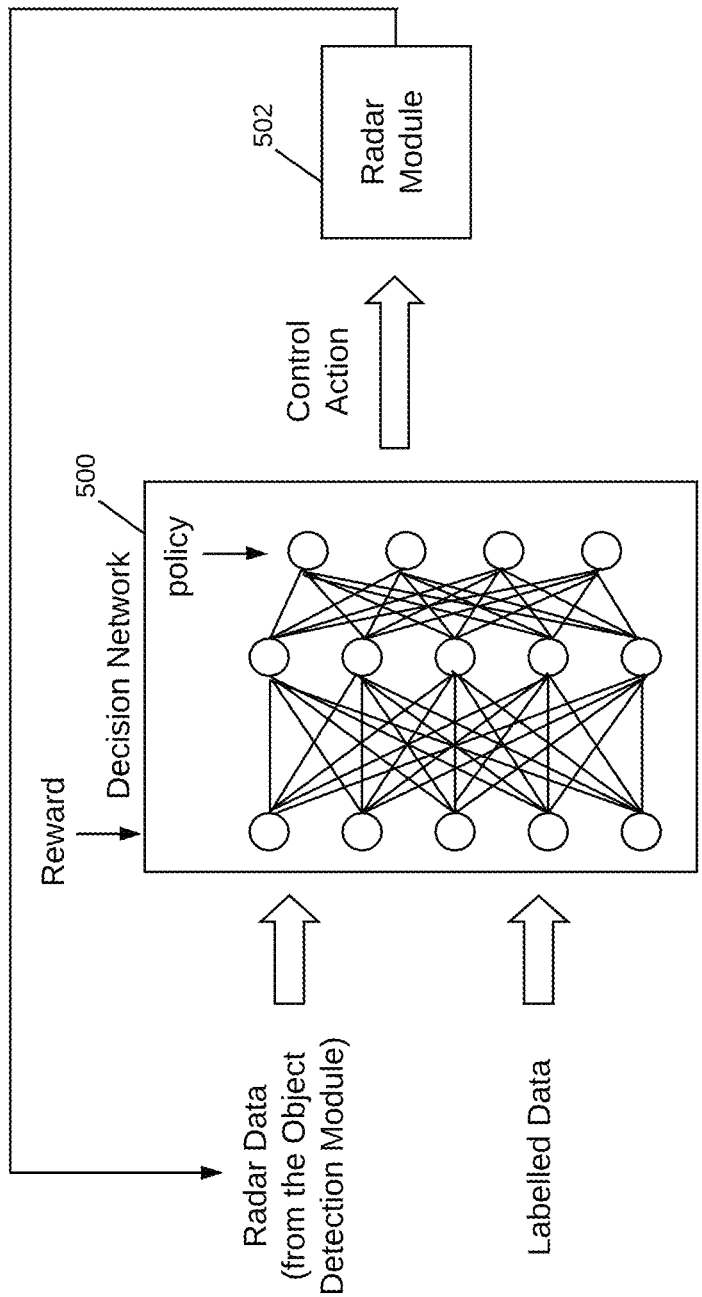
FIG. 5 illustrates training of a decision network in accordance with various examples.

Attention is now directed to FIG. 5, which illustrates training of a decision network in accordance with various examples. Decision network 500 is a Q-learning network that receives output data from the object detection module in the radar module 502 and determines an action for the beam steering antenna in the radar module 502 to perform. The action can be, for example, to steer RF beams to a given direction in the FoV upon detecting an object in that area. In order to select the best action, decision network 500 is trained based on reinforcement learning, a machine learning technique inspired by behavioral psychology. The idea is to have the decision network 500 choose an action for a given state such that its reward is maximized. In this case, the state is the output of the object detection module, the action is a selection of beam parameters for the beam steering antenna to know where to direct its next beams with the selected parameters (e.g., beam width, direction, etc.), and the reward is the performance of the object detection module and decision network following the selections.

Training the decision network 500 boils down to indicating to the decision network 500 when it is doing well and when it is doing poorly. For example, reinforcement learning is used to train dogs. You cannot tell the dog what to do, but over time the dog will understand that certain actions lead to more rewards. The rewards are also not the same; some rewards may be more likely or desirable than others. The goal of the decision network 500 is then to maximize its expected future reward of an action given a state. Training of the decision network 500 is accomplished by teaching the decision network 500 to have the optimal representation of the space of states, actions, and rewards.

At each training step, radar data from the object detection module is compared to a set of labeled data representing the "ground truth." The comparison is used to determine whether to reward the behavior of the object detection module or penalize its response according to a reward criteria. The reward criteria is based on the closeness of the detected objects to the labelled data, such as Euclidean distance, weighted binary cross entropy, or another such measure. The decision network 500 determines a control action for the radar module 502 perform to control its beam steering antenna. The control action may indicate, for example, a new steering angle for the beam steering antenna. During training, the decision network 500 is run to explore the action space with a fixed probability of taking random actions. An optional weighting may be performed to enhance the reward criteria, where the weighting is applied to modify a radar control action. At the end of training, a control policy is generated to ensure the decision network will direct the radar module 502 to perform the best control action for its beam steering antenna.

Figure 6:
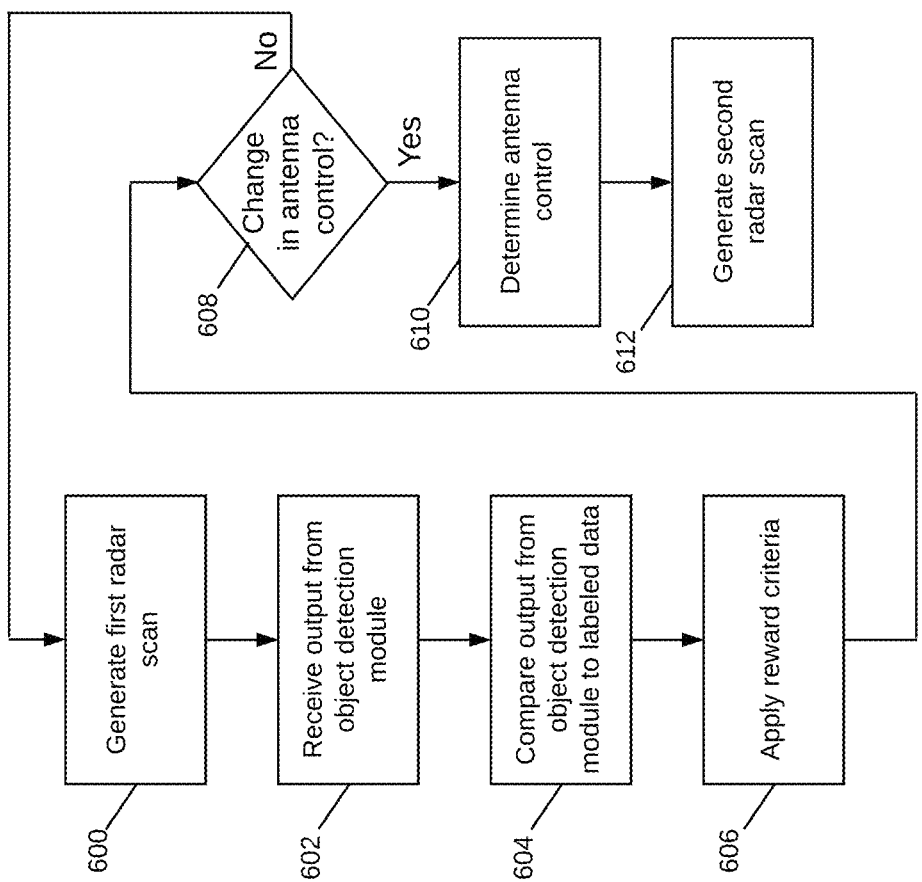
FIG. 6 is a flowchart for training a decision network in accordance with various examples.

A flowchart for training the decision network 500 is illustrated in FIG. 6. First, a radar scan is generated (600) to produce a set of radar data from the object detection module (602). The output of the object detection module is compared to a set of "ground truth" or labeled data (604). Depending on the result of the comparison, a reward criteria is applied to the decision network (606) to determine whether to change the control of the beam steering antenna (608). If so, the proper control action is determined (610), e.g., to steer the antenna to a different direction, and the radar proceeds with a second scan (612). At the end of training, the control policy is finalized for the decision network 500. The control policy enables the decision network 500 to choose the best actions for the radar module to perform in a next scan based on the objects detected in the current scan.

Figure 7:
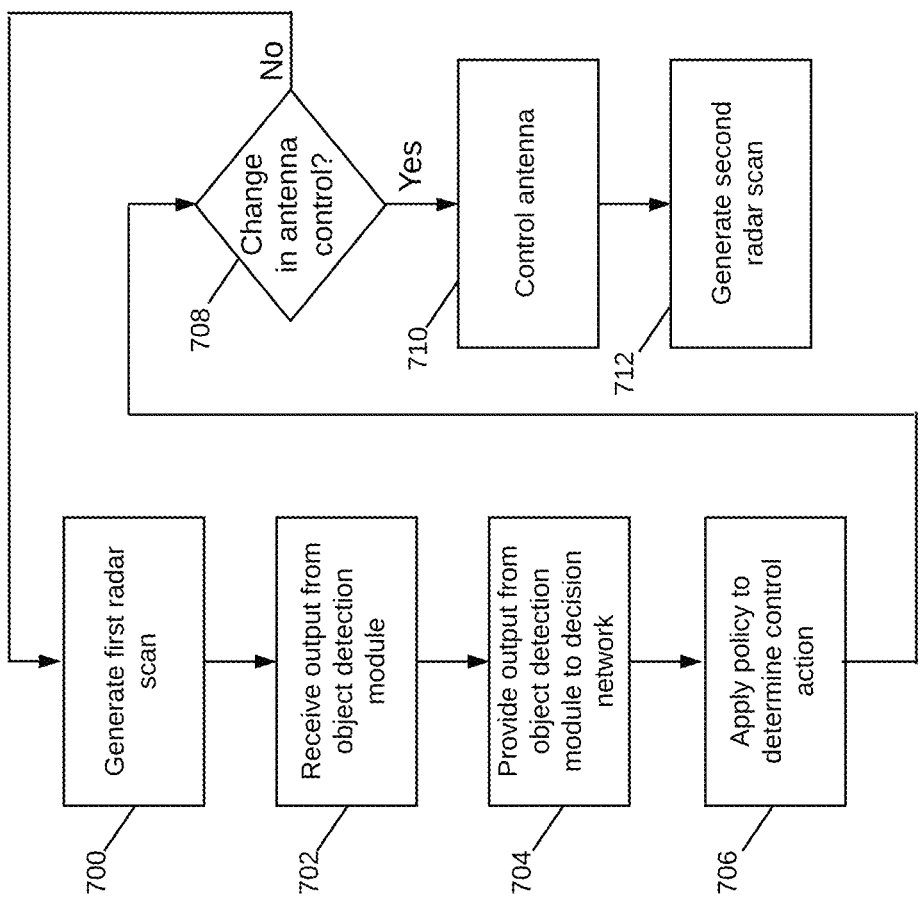
FIG. 7 is a flowchart for operating a decision network in a beam steering radar in accordance with various examples.

In operation, and as illustrated in the flowchart of FIG. 7, after a first scan is generated (700) and the object detection module generates its output radar data (702), the output is provided to the decision network (704). The decision network then applies the policy generated during training (706) to determine whether a change in antenna control is needed (708). If so, the antenna controller in the radar module directs the beam steering antenna according to the policy (710). This may mean, for example, directing the beam steering antenna to focus on a different area or to change beam parameters, such as beam width, steering angle, and so forth.

The various examples described herein support autonomous driving with improved sensor performance, all-weather/all-condition detection, advanced decision-making algorithms and interaction with other sensors through sensor fusion. Sensor fusion is optimized with the use of a radar sensor, as radar is not inhibited by weather conditions and is able to detect different objects at a long range, e.g., 300 meters. The radar module described herein is effectively a "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for operating a radar system in an autonomous vehicle, comprising:
   performing a training process using a reward criteria to generate a control policy;
   generating a radar scan;
   receiving an output from an object detection module in the radar system;
   providing the output from the object detection module to a decision network in the radar system;
   applying the control policy to determine a control action based on the output of the object detection module; and
   controlling a beam steering antenna to perform the control action.

2. The method of claim 1, further comprising providing a steering angle control for the beam steering antenna.

3. The method of claim 1, further comprising transmitting radar data to the object detection module.

4. The method of claim 1, wherein the object detection module implements a convolutional neural network.

5. The method of claim 1, further comprising tracking detected objects over time.

6. The method of claim 1, wherein the control action indicates a new steering angle for the beam steering antenna.

7. The method of claim 1, wherein generating a radar scan comprises generating a radar signal with a set of adjustable scan parameters.

8. The method of claim 1, wherein the output comprises object data for a detected object.

9. The method of claim 1, further comprising determining whether a change in antenna control is needed.

10. The method of claim 1, wherein the beam steering antenna comprises a meta-structure antenna.

11. The method of claim 1, wherein controlling the beam steering antenna comprises steering an RF beam with a steering angle.

* * * * *